US011920396B2

(12) United States Patent
Kuter-Arnebeck et al.

(10) Patent No.: US 11,920,396 B2
(45) Date of Patent: Mar. 5, 2024

(54) ACCESS DOOR FOR A STORAGE UNIT

(71) Applicant: Snap-on Incorporated, Kenosha, WI (US)

(72) Inventors: Ottoleo Kuter-Arnebeck, Kenosha, WI (US); Nicholas H. Weir, Silver Lake, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/144,684

(22) Filed: Jan. 8, 2021

(65) Prior Publication Data

US 2022/0220787 A1 Jul. 14, 2022

(51) Int. Cl.

| | |
|---|---|
| ***E05F 3/00*** | (2006.01) |
| ***B25H 3/00*** | (2006.01) |
| ***B25H 3/02*** | (2006.01) |
| ***E05F 1/10*** | (2006.01) |

(52) U.S. Cl.

CPC ............. *E05F 1/1091* (2013.01); *B25H 3/00* (2013.01); *B25H 3/028* (2013.01); *E05Y 2900/20* (2013.01)

(58) Field of Classification Search

CPC ........ E05F 1/1091; Y10T 16/22; Y10T 16/27; Y10T 16/56; Y10T 16/281; B25H 3/00; B25H 3/028

See application file for complete search history.

(56) References Cited

U.S. PATENT DOCUMENTS 890,207 A * 6/1908 Anderson ........................ 16/84
2,028,954 A 1/1936 Roedding
2,451,381 A 10/1948 Curtiss, Jr.
3,020,581 A 2/1962 Falk
3,432,882 A * 3/1969 Philip ........................ E05D 1/06 16/257
4,194,264 A 3/1980 Stoffregen
4,225,261 A * 9/1980 Marx .................... F16C 11/069 403/135
4,302,866 A 12/1981 Irvin
4,383,721 A 5/1983 Weger (Continued)

FOREIGN PATENT DOCUMENTS

CN 110894766 A 3/2020
CN 211019537 U 7/2020

(Continued)

OTHER PUBLICATIONS

Combined Search and Examination Report for corresponding Application No. GB2200115.0 dated Jun. 29, 2022, 6 pages.

(Continued)

*Primary Examiner* — Kimberley S Wright

(74) *Attorney, Agent, or Firm* — Seyfarth Shaw LLP

(57) ABSTRACT

A storage unit having an interior containment space. The storage unit includes a connection member, an access door coupled to the storage unit via a hinge and adapted to cover at least a portion of the interior containment space, and a biasing member having opposing first and second ends. The first end is coupled to the access door, and the second end is releasably coupled to the connection member. The second end is adapted to be released from the connection member when the access door is overextended or opened with too great a force.

17 Claims, 3 Drawing Sheets

(56) References Cited

U.S. PATENT DOCUMENTS

| | | | | | |
|---|---|---|---|---|---|
| 4,899,420 | A * | 2/1990 | Bye | E05F 3/02 | 16/349 |
| 5,551,125 | A * | 9/1996 | Adams | E05D 7/1022 | 16/229 |
| 5,618,089 | A | 4/1997 | Stenemann | | |
| 5,758,937 | A | 6/1998 | Lammens et al. | | |
| 5,833,383 | A * | 11/1998 | Bauman | F16C 11/069 | 403/141 |
| 6,130,822 | A * | 10/2000 | Della Fiora | G06F 1/181 | 361/679.6 |
| 6,233,784 | B1 * | 5/2001 | Daoud | E05D 7/1077 | 16/229 |
| 6,394,566 | B1 | 5/2002 | Happ et al. | | |
| 6,578,938 | B2 | 6/2003 | Norman et al. | | |
| 6,719,384 | B1 * | 4/2004 | Parise | B25H 3/00 | 312/249.9 |
| 7,146,766 | B2 | 12/2006 | Finkelstein | | |
| 7,690,715 | B2 | 4/2010 | Hakamata et al. | | |
| 7,722,141 | B2 * | 5/2010 | Parise | B25H 3/00 | 312/352 |
| 7,886,407 | B2 | 2/2011 | Blersch et al. | | |
| 7,993,070 | B2 * | 8/2011 | Kull | F16C 11/069 | 403/329 |
| 8,033,620 | B2 | 10/2011 | Retchloff | | |
| 8,056,183 | B2 | 11/2011 | Ruesink et al. | | |
| 8,157,337 | B2 | 4/2012 | Grela et al. | | |
| 8,317,277 | B2 | 11/2012 | Gutnick et al. | | |
| 8,322,732 | B2 | 12/2012 | Philpott et al. | | |
| 8,636,330 | B2 | 1/2014 | Nam et al. | | |
| 8,839,559 | B2 | 9/2014 | Neff | | |
| 9,140,293 | B2 | 9/2015 | Schilz et al. | | |
| 10,196,822 | B2 | 2/2019 | Deutsch | | |
| 10,293,478 | B2 | 5/2019 | Manalang et al. | | |
| 10,851,567 | B2 * | 12/2020 | Sharp | E05C 1/14 | |
| 2002/0066229 | A1 | 6/2002 | Rubio | | |
| 2004/0076464 | A1 * | 4/2004 | Jones | F16C 11/069 | 403/76 |
| 2005/0035696 | A1 * | 2/2005 | Parise | A47B 87/007 | 312/249.9 |
| 2007/0075554 | A1 | 4/2007 | Gavriles | | |
| 2008/0164791 | A1 * | 7/2008 | Parise | B25H 3/00 | 312/249.9 |
| 2010/0047012 | A1 * | 2/2010 | Kull | F16C 1/14 | 403/325 |
| 2010/0127606 | A1 | 5/2010 | Collene et al. | | |
| 2014/0137477 | A1 | 5/2014 | Haruta et al. | | |
| 2015/0176316 | A1 | 6/2015 | Tschap | | |
| 2018/0320422 | A1 * | 11/2018 | Sharp | E05B 65/46 | |
| 2019/0285113 | A1 | 9/2019 | Gardynik et al. | | |

FOREIGN PATENT DOCUMENTS

| | | | | |
|---|---|---|---|---|
| DE | 4304615 | A1 | 8/1994 | |
| DE | 202006009277 | | 9/2006 | |
| EP | 1116846 | A1 * | 7/2001 | A47B 88/047 |
| EP | 0940591 | | 2/2004 | |
| EP | 2853669 | | 4/2015 | |
| EP | 2801762 | | 1/2018 | |
| FR | 2906293 | | 11/2010 | |
| GB | 2360297 | A | 9/2001 | |
| JP | 2001098827 | A | 4/2001 | |
| JP | 2003193729 | A | 7/2003 | |
| KR | 20060054797 | | 5/2006 | |
| KR | 20090112248 | | 10/2009 | |
| KR | 100941094 | B1 * | 2/2010 | |
| TW | 200525073 | A | 8/2005 | |
| WO | 2007084017 | | 7/2007 | |

OTHER PUBLICATIONS

Taiwan Office Action for corresponding Application No. 11220104280 dated Feb. 6, 2023, 4 pages.

Examination Report for corresponding United Kingdom Application No. GB2200115.0 dated Mar. 10, 2023, 4 pages.

United Kingdom Combined Search and Examination Report for corresponding UK Application No. GB2306901.6, dated Nov. 17, 2023, 5 pages.

Chinese Office Action for corresponding CN Application No. 2021116403017, dated Sep. 6, 2023, 10 pages.

* cited by examiner

ACCESS DOOR FOR A STORAGE UNIT

TECHNICAL FIELD OF THE INVENTION

The present invention relates generally to an access door that provides access to an interior containment space of a storage unit.

BACKGROUND OF THE INVENTION

Storage units, such as, for example, toolboxes and cabinets, commonly include access doors to provide access to interior containment spaces. Access doors are typically coupled to the storage units using a hinge, which allows the door to be selectively disposed in either one of opened and closed positions. However, when disposed in the opened position, thereby providing access to the interior containment space, the door may unintentionally be moved to the closed position, such as if inadvertently jarred by an operator and/or due to the storage unit being disposed on an uneven surface. Also, if the access door is moved into the opened position with too great a force, the access door, storage unit, and/or hinge could be damaged. Additionally, access doors are typically maintained in the closed position utilizing a magnet(s). However, the magnetic force can be strong, thus making it difficult for the operator to overcome the magnetic force to move the access door into the opened position.

SUMMARY OF THE INVENTION

The present invention relates broadly to an access door that provides access to an interior containment space of a storage unit, such as, for example, toolboxes and cabinets. The access door is coupled to the storage unit via a hinge and is adapted to be selectively disposed in either one of opened and closed states. When in the opened state, the access door allows access to the interior containment space. When in the closed state, the access door disallows access to the interior containment space. The access door includes a latch adapted to maintain the access door in the closed position. The access door also includes a biasing member, such as, for example, a compression spring or gas strut, adapted to assist in moving the access door to either of the opened and/or closed positions, and/or to maintain the access door in the opened position. The biasing member is releasably coupled to the storage unit by a quick disconnect mechanism that disengages the biasing member from the storage unit when the access door is overextended and/or opened with too great a force. By releasably coupling the biasing member to the storage unit using a quick disconnect mechanism, the possibility of damage to the access door, storage unit, and/or hinge due to over-extending the door while opening is lessened, compared to current solutions. Also, by using a latch to maintain the access door in the closed position, less force is required to open the access door compared to current solutions.

In an embodiment, the present invention broadly comprises a storage unit having an interior containment space. The storage unit includes a connection member, a bracket having an attachment feature, an access door adapted to cover at least a portion of the interior containment space, and a biasing member having opposing first and second ends. The first end is coupled to the attachment feature, and the second end is releasably coupled to the connection member. The second end is adapted to be released from the connection member when the access door is over-extended while being opened, or otherwise opened with too great a force.

In another embodiment, the present invention broadly comprises an access door adapted to be coupled to a storage unit and cover at least a portion of an interior containment space of the storage unit. The access door includes a biasing member having opposing first and second ends. The first end is coupled to the access door, and the second end is adapted to be releasably coupled to a connection member disposed on the storage unit. The second end is adapted to be released from the connection member when the access door is over-extended while being opened, or otherwise opened with too great a force.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
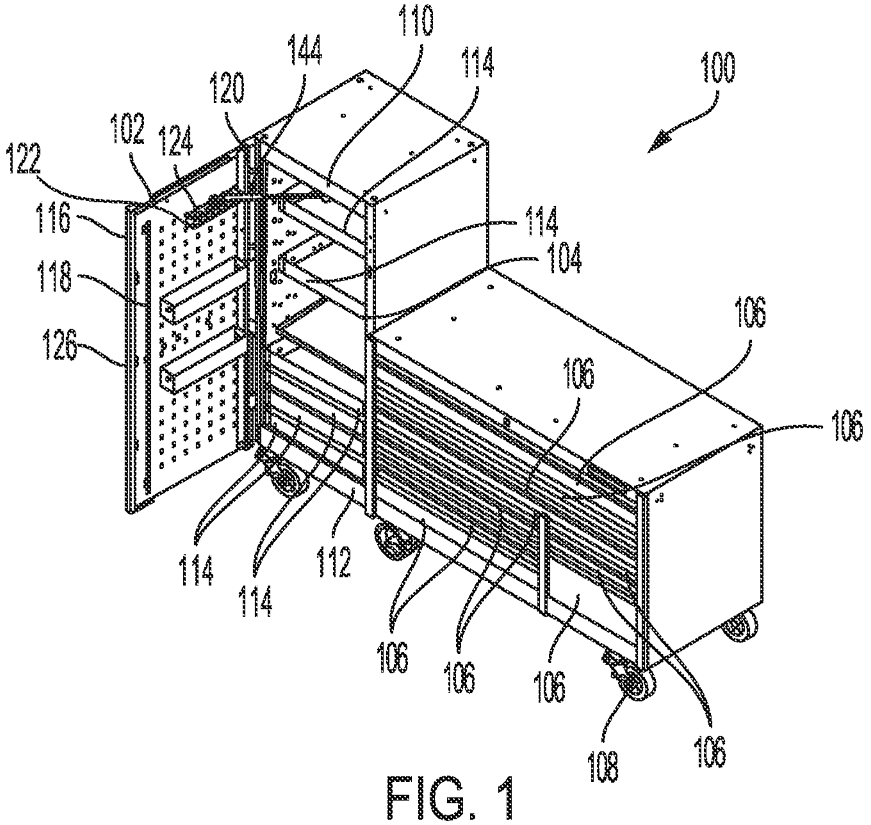
FIG. 1 is a perspective view of an exemplar storage unit, such as a tool storage cabinet, in accordance with an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term “present invention” is not intended to limit the scope of the claimed invention, but is instead used to discuss exemplary embodiments of the invention for explanatory purposes only.

The present invention broadly includes an access door to an interior containment space of a storage unit, such as, for example, toolboxes and roll cabinets. The access door is adapted to be selectively disposed in either one of opened and closed states. The access door includes a latch assembly adapted to selectively maintain the access door in the closed position. The access door also includes a biasing member, such as, for example, a compression spring or gas strut, adapted to assist in moving the access door between the opened and/or closed positions, and/or maintain the access door in the opened position. The biasing member is releasably coupled to the storage unit by a quick disconnect connection that disengages the biasing member from the storage unit when the door is over-extended while being opened, and/or opened with too great a force.

Referring to FIGS. 1-8, a storage unit 100, such as, for example, roll cabs, toolboxes, cabinets, etc., according to an embodiment of the present invention, includes an access door 102 that covers at least a portion of an interior containment space 104 of the storage unit 100, drawers 106, or similar sub-enclosures, adapted to move into and out of the storage unit 100, wheels 108, and first 110 and second 112 fascia plates. In an embodiment, the interior containment space 104 includes drawers and/or shelves 114 adapted to move into and out of the interior containment space 104. However, the storage unit 100 is not limited as such and may include other features, such as, for example, hangers, brackets, emblems, shelves, etc.

The access door 102 includes a latch assembly 116 and a locking rod 118 and is coupled to the storage unit 100 via a hinge 120. The locking rod 118 is adapted to put the access door 102 in a locked state via a lock (not shown) to prevent the access door 102 from being opened in a well-known manner. Although shown in a vertical orientation, the invention is not limited as such, and the access door 102 may be disposed in other orientations, such as, for example, a horizontal orientation. In an embodiment, the access door 102 includes a bracket 122 having attachment features 124, such as, for example, apertures.

Figure 5:
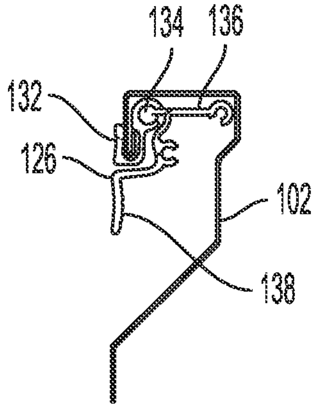
FIG. 5 is a side view of an exemplar latch assembly, according to an embodiment of the present invention.
Figure 6:
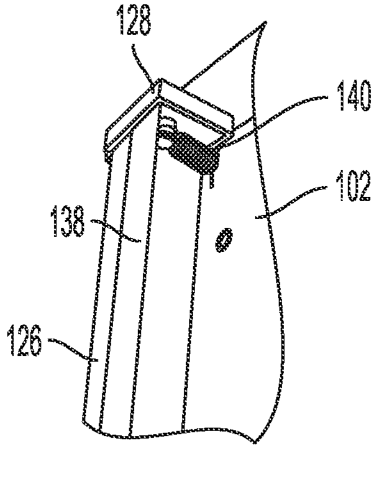
FIG. 6 is a detail view of the latch assembly of FIG. 5 disposed on an exemplar access door, according to an embodiment of the present invention.
Figure 7:
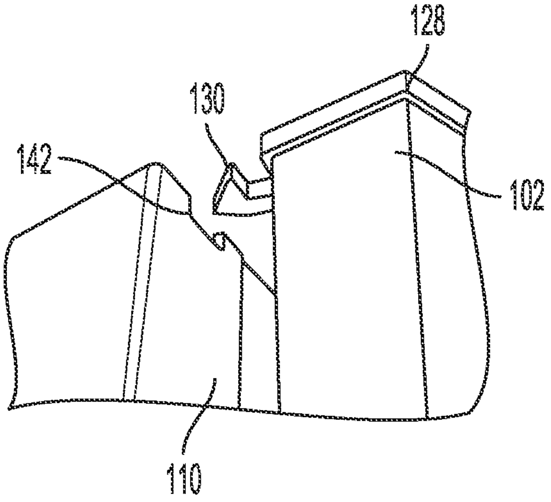
FIG. 7 is a detail view of the latch assembly of FIG. 5 disposed on an exemplar access door that is in an opened position.

The latch assembly 116 is adapted to selectively maintain the access door 102 in the closed position. The latch assembly 116 includes a handle 126 that is flexibly coupled to the access door 102, as illustrated in FIG. 5, a cap 128, and a latch 130, as illustrated in FIG. 7. In an embodiment, the handle 126 is coupled to the access door 102 at a crimped portion 132. The handle 126 also includes a joint 134, a branch 136, and a grip portion 138. The joint 134 and the branch 136 cooperatively allow the grip portion 138 to be moved in a preferred direction to allow the handle 126 to actuate the latch 130. The latch 130 engages a notch or detent 142 in the first 110 and/or second 112 fascia plates to selectively retain the access door 102 in a closed position. As shown in FIG. 6, the grip portion 138 is further coupled to the access door 102 via a biasing member 140, such as, for example, a spring, to enable the grip portion 138 to return to a neutral position defined by the branch 136.

The access door 102 is also connected to the storage unit 100 via a biasing member 144, such as, for example, a compression spring or gas strut, that is adapted to assist in moving the access door 102 between the opened and/or closed positions, and/or maintain the access door 102 in the opened position. The biasing member 144 includes opposing first 146 and second 148 ends. The first end 146 of the biasing member 144 is coupled to the bracket 122 disposed on the access door 102 at one of the attachment features 124. The multiple attachment features 124 enable the biasing member 144 to be coupled at different locations along the bracket 122, thereby allowing adjustment of the opening angle of the access door 102 with respect to the storage unit 100. The second end 148 (i.e., quick disconnect end) of the biasing member 144 is adapted to releasably couple to the storage unit 100 via a connection member 152, such as, for example, a stud. The connection member 152 is disposed on the first 110 and/or second 112 fascia plates. The second end 148 is adapted to be released from the connection member 152 when the access door 102 is overextended and/or opened with too great a force, thereby restricting damage to one or more of the access door 102, storage unit 100, hinge 120, and/or an operator.

Figure 2:
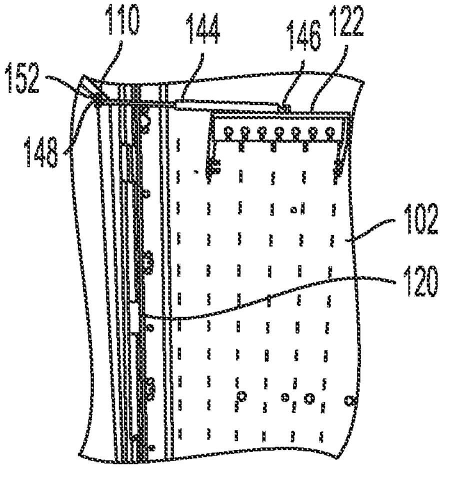
FIG. 2 is a detailed view of an exemplar biasing member coupled to an exemplar access door and storage unit, according to an embodiment of the present invention.
Figure 3:
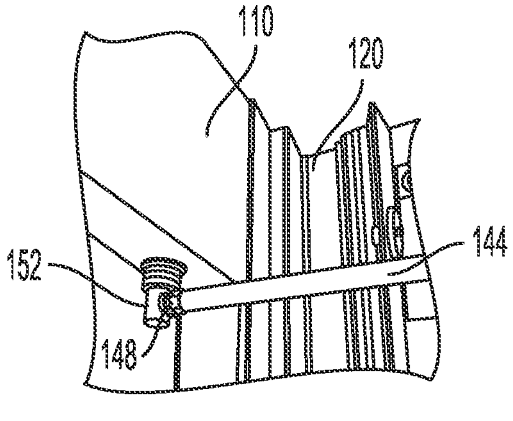
FIG. 3 is a detailed view of a quick disconnect mechanism releasably coupling an exemplar biasing member to an exemplar storage unit, according to an embodiment of the present invention.
Figure 4:
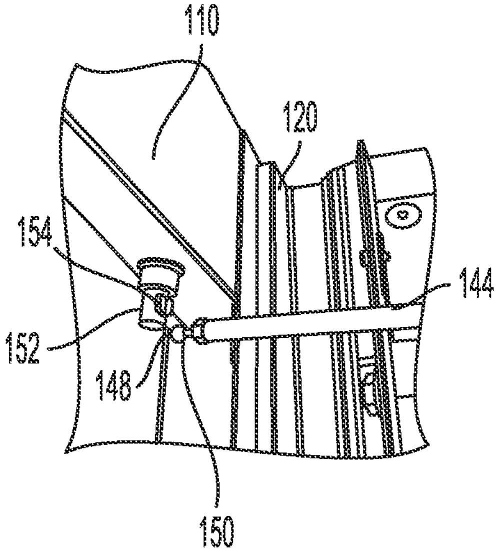
FIG. 4 is a detailed view of the quick disconnect mechanism of FIG. 3 disengaged from the biasing member.

In an embodiment, as illustrated in FIGS. 2-4, the second end 148 of the biasing member 144 includes a ball 150. In an embodiment, the connection member 152 includes an opening 154 adapted to receive the ball 150. The opening 154 is smaller than the ball 150, thereby "trapping" the ball 150. The opening 154 can be sized to provide enough retention force to retain the ball 150 therein, while also allowing the ball 150 to disengage if the access door 102 is overextended and/or opened with too great a force. In another embodiment (not shown), the ball is releasably coupled to the opening 154 of the connection member 152 using a retaining member, such as, for example, a spring clip, thereby allowing retention force to be adjusted to allow the biasing member 144 to disengage from the connection member 152 if the access door 102 is overextended and/or opened with too great a force.

Figure 8:
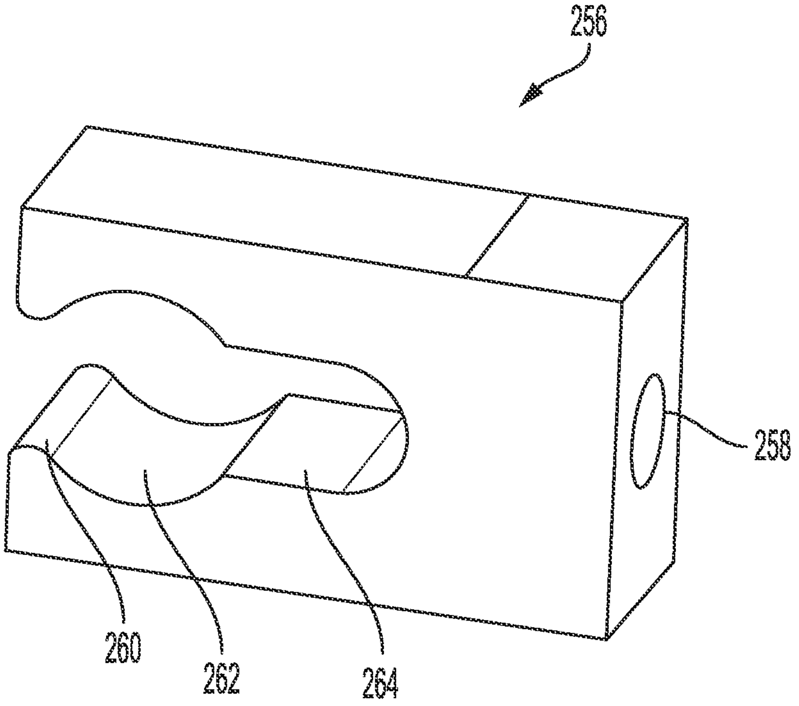
FIG. 8 is a perspective view of a clip, according to another embodiment of the present invention.

In an another embodiment, as illustrated in FIG. 8, the second end 148 of the biasing member 144 is coupled to a clip 256 having an aperture 258. The second end 148 can be press fit or threadably coupled to the aperture 258. The clip 256 further includes a clip opening 260 and a hemisphere section 262 adapted to receive the connection member 152. The clip opening 260 is smaller than the diameter of the hemisphere section 262. The diameter of the hemisphere section 262 corresponds with the diameter of the connection member 152. The clip 256 also includes a cut section 264 adapted to allow the clip opening 260 and hemisphere section 262 to expand to receive and releasably couple to the connection member 152, similar to a clamping action. If the access door 102 is overextended and/or opened with too great a force, the opening 263 and hemisphere section 262 are adapted to expand, via the cut section 264, to allow disengagement of the biasing member 144 from the connection member 152.

In an alternate embodiment (not shown), the bracket 122 can be disposed on the storage unit 100, and the connection member 152 is disposed on the access door 102.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A storage unit having an interior containment space, the storage unit comprising:

a connection member including an opening;

a bracket having an attachment feature;

an access door adapted to cover at least a portion of the interior containment space; and a biasing member having opposing first and second ends, the first end coupled to the attachment feature and the second end includes a ball engaging the opening to releasably couple the biasing member to the connection member, wherein the ball disengages from the opening to release the second end from the connection member when the access door is over-extended.

2. The storage unit of claim 1, further comprising a latch assembly disposed on the access door.

3. The storage unit of claim 2, wherein the latch assembly includes a handle, a cap, and a latch.

4. The storage unit of claim 3, wherein the handle includes a grip portion, a joint, and a branch, and wherein the joint and branch cooperatively allow the grip portion to be moved in a direction to actuate the latch.

5. The storage unit of claim 1, further comprising wheels adapted to allow the storage unit to be moved.

6. The storage unit of claim 1, further comprising drawers adapted to be moved into and out of the storage unit.

7. The storage unit of claim 1, wherein the bracket is disposed on the access door.

8. An access door adapted to be coupled to a storage unit and cover at least a portion of an interior containment space of the storage unit, wherein the storage unit includes a connection member having an opening, the access door comprising:

a compression spring or gas strut having opposing first and second ends, wherein the first end is coupled to the access door and the second end includes a ball adapted to engage the opening to releasably couple the compression spring or gas strut to the connection member, wherein the ball is adapted to disengage from the opening to release the second end from the connection member when the access door is over-extended.

9. The access door of claim 8, further comprising a bracket disposed on the access door and having an attachment feature adapted to couple to the first end of the compression spring or gas strut.

10. The access door of claim 9, wherein the bracket includes multiple attachment features adapted to couple to the first end of the compression spring or gas strut.

11. A storage unit having an interior containment space, the storage unit comprising:

a connection member;

a clip adapted to receive the connection member to releasably couple to the connection member;

a bracket having an attachment feature;

an access door adapted to cover at least a portion of the interior containment space; and a biasing member having opposing first and second ends, the first end coupled to the attachment feature and the second end coupled to the clip, wherein the clip disengages from the connection member when the access door is over-extended.

12. The storage unit of claim 11, wherein the clip includes a clip opening, a hemisphere section, and a cut section adapted to allow the clip opening and hemisphere section to expand to receive and releasably couple to the connection member.

13. The storage unit of claim 11, wherein clip opening is smaller than a diameter of the connection member.

14. The storage unit of claim 11, wherein the clip is threadably coupled to the second end.

15. The storage unit of claim 11, wherein the clip is press fit to the second end.

16. An access door adapted to be coupled to a storage unit and cover at least a portion of an interior containment space of the storage unit, wherein the storage unit includes a connection member having an opening, the access door comprising:

a bracket disposed on the access door and having an attachment feature; and a biasing member having opposing first and second ends, wherein the first end is coupled to the attachment feature and the second end includes a ball adapted to engage the opening to releasably couple the biasing member to the connection member, wherein the ball is adapted to disengage from the opening to release the second end from the connection member when the access door is over-extended.

17. The access door of claim 16, wherein the bracket includes multiple attachment features.

* * * * *